United States Patent
Tiwari et al.

(12) 
(10) Patent No.: US 8,473,697 B1
(45) Date of Patent: Jun. 25, 2013

(54) METHOD AND SYSTEM FOR VOLUME BASED SNAPSHOT RESTORE

(75) Inventors: Ritesh Tiwari, Bangalore (IN); Gaurab Paul, Bangalore (IN); Vasantha Prabhu, Bangalore (IN); Rushi S. Surla, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 1274 days.

(21) Appl. No.: 12/260,944

(22) Filed: Oct. 29, 2008

(51) Int. Cl.
*G06F 12/00* (2006.01)
*G06F 13/00* (2006.01)
*G06F 13/28* (2006.01)

(52) U.S. Cl.
USPC .......................................... 711/162; 707/639

(58) Field of Classification Search
USPC ....................................................... 711/162
See application file for complete search history.

(56) References Cited

U.S. PATENT DOCUMENTS

| | | | | |
|---|---|---|---|---|
| 7,720,817 B2* | 5/2010 | Stager et al. | ................... | 707/649 |
| 7,822,933 B1* | 10/2010 | Sontakke et al. | ............. | 711/162 |
| 8,255,651 B2* | 8/2012 | Liu et al. | ....................... | 711/162 |
| 2007/0245105 A1* | 10/2007 | Suzuki et al. | ................ | 711/162 |
| 2008/0222373 A1* | 9/2008 | Garimella | ..................... | 711/161 |

* cited by examiner

*Primary Examiner* — Christian P Chace
*Assistant Examiner* — Prasith Thammavong
(74) *Attorney, Agent, or Firm* — Klein, O'Neil & Singh, LLP

(57) ABSTRACT

Method and system is provided to perform a plurality of checks before performing a volume based snapshot restore ("VBSR") operation. The checks may be performed by an application executed at a computing system that interfaces with a storage system. The application may determine if there are any inconsistent LUNS and foreign mapped LUNs. The application may also determine if there are any new LUNs or any new snapshots since the snapshot, which is the basis of the restore operation was created. The application may further determine if there are any backup relationships with respect to a volume that is being restored. The application takes the information and provides a report to a user. The report allows a user to ascertain the consequences of proceeding with the VBSR operation.

25 Claims, 12 Drawing Sheets

```
[root @lnx197-122 ~]# snapdrive snap restore -lun bart:/vol/volritesh3/lunx -snapname lunxsnap -f -vbsr preview -verbose
Checking : bart:/vol/volritesh3 ...
    Mandatory checks starting ...
        (1) /vol/volritesh3 is not root storage system volume ...PASSED
        (2) Snapshots created after lunxsnap do not have volume clones ... PASSED
        (3) Luns mapped and not in active or snapshot ... FAILED:
                bart:/vol/volritesh3/lunx1
                    [    Initiator group : bart:lnx197-122_iscsi_Sdlg { iqn.1987-05.com.cisco:01.c4ff4c03456 ; } ] ;
        (4) No SnapMirror relationships exist   ... PASSED.
        (5) No SnapVault relationships exist ...PASSED.
OVERRIDEABLE checks starting ....
        (1) luns not owned by
            are application consistent in snapshotted volume ... PASSED
        (2) No new luns created after snapshot lunxsnap ... FAILED.
            Luns created which will be lost:
                bart:/vol/volritesh3/lunx1
        (3) No new snapshots exist ... FAILED
            Snaps created which will be lost:
                nightly.0
                hourly.0
                hourly.1
                hourly.2
                hourly.3
                nightly.1
                hourly.4
                hourly.5
        (4) No normal files exist ... PASSED
        (5) NFS export list does not have foreign hosts ... FAILED.
            rw hosts: all-hosts : true
        (6) No CIFS shares exist .... PASSED.
0002-310 Admin error: Please correct the above failures for mandatory and override checks to proceed with volume restore
[root@lnx197-122 ~]#
```

FIG. 6

METHOD AND SYSTEM FOR VOLUME BASED SNAPSHOT RESTORE

BACKGROUND

1. Technical Field

The present disclosure relates to storage systems.

2. Related Art

A storage system typically includes one or more storage devices where information is stored. The storage system may be implemented in accordance with a variety of storage architectures including, but not limited to, a network-attached storage ("NAS") environment, a storage area network ("SAN") and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system typically includes a storage operating system that organizes the stored information. The storage operating system may implement a high-level module, for example, a file system, to logically organize information stored on storage volumes as a hierarchical structure of data containers, such as files and logical units. For example, each "on-disk" file may be implemented as set of data structures, i.e., disk blocks, configured to store information, such as the actual data for the file. These data blocks are organized within a volume block number (VBN) space that is maintained by the file system.

In order improve reliability and to facilitate disaster recovery in the event of a failure within the storage system, it is common to replicate, some or all the underlying data and/or the file system that organizes that data from a source storage volume associated with primary storage system or server to one or more remote storage destinations (i.e. secondary storage).

"Snapshot" is one way to replicate a source storage volume. The term "Snapshot" (or "snapshot") in this context means a persistent point in time (PPT) image of a file system that enables quick recovery of data after data has been corrupted, lost, or altered. Snapshots can be created by copying information at a predetermined point in time to form a consistent image.

A volume based snapshot restore (VBSR) operation may be used to restore a storage volume to a snapshot copy. Typically, a VBSR operation is performed by a storage administrator that has access to the storage devices and is familiar with how a storage volume is being used.

It becomes challenging when the VBSR operation is performed by a host based application that may not be aware of how a storage volume is being utilized, at any given time. For example, the host based application may not be aware that a storage volume may be shared by other host systems; there may be inactive, foreign or inconsistent logical unit numbers (LUNs); or the storage volume may be root volume.

If a host based application performs the VBSR operation without knowing the characteristics of the storage volume, it may result in unstable conditions within the storage system, including loss of information. Therefore, it is desirable to provide storage volume information to a user before a user performs a VBSR operation.

SUMMARY

In one embodiment, a method and system is provided to perform a plurality of checks before performing a volume based snapshot restore ("VBSR") operation. The checks may be performed by an application executed at a computing system that interfaces with age system. The application may determine if there are any inconsistent LUNS (logical unit numbers) and foreign mapped LUNs. The application may also determine if there are any new LUNs or any new snapshots since the snapshot, which is the basis of the restore operation was created.

The application may also determine if there are any backup relationships with respect to a volume that is being restored. The application may further determine if there are any "clones" of the snapshot, which is the basis of the restore operation. The application may further determine if there are any files that are being shared by other hosts.

The application takes all the information and provides a consolidated report to a user. The report allows a user to ascertain the consequences of proceeding with the VBSR operation. The user can take preventive measures to minimize any negative impact, proceed with the VBSR regardless of the consequences or abort the VBSR operation.

In another embodiment, a method a storage system is provided. Before a volume based snapshot restore (VBSR) operation is performed by a host computing system application, based on a point in time copy of a storage volume; the method performs the following: (a) determining if any inconsistent logical unit number (LUN) and foreign mapped logical unit number (LUN) exist with respect the point in time copy of the storage volume; (b) obtaining information related to the inconsistent LUN and the foreign mapped LUN; (c) determining if a new LUN was created after the point in time copy was created for the storage volume; and (d) providing a user with information collected in steps (a) to (c) before the VBSR operation is performed.

In yet another embodiment, a method for a storage system is provided. Before a volume based snapshot restore (VBSR) operation is performed by a host computing system application, based on a point in time copy of a volume; the method performs the following: (a) determining if the storage volume is a root volume and aborting the VBSR operation, if the storage volume is a root volume; (b) determining if any inconsistent logical unit number (LUN) and foreign mapped logical unit number (LUN) exist with respect to the point in time copy of the storage volume; (c) obtaining information related to the inconsistent LUN and the foreign mapped LUN; (d) determining if a new LUN was created after the point in time copy was created for the storage volume; (e) determining if a backup relationship exists for the storage volume; and if the backup relationship exists, obtaining the backup relationship information; (f) determining if another point in time copy was created after the point in time copy for the storage volume, which the basis for the VBSR operation; (g) determining it a LUN at the storage volume is shared with a host computing system; and (h) providing a user with information collected in steps (b) to (g) such that the user can take an action before the VBSR operation is performed.

In yet another embodiment, a method for a storage system is provided. The method includes, performing a plurality of checks before a volume based snapshot restore (VBSR) operation performed by a host computing system application, based on a point in time copy of a storage volume, wherein the plurality of checks include: (a) determining if the storage volume is a root volume and aborting the VBSR operation, if the storage volume root volume; (b) determining if any inconsistent logical unit number (LUN) and foreign mapped logical unit number (LUN) exist with respect to the point in time copy of the storage volume; wherein a metadata file for the point in time copy stores information regarding the foreign mapped LUN and the inconsistent LUN; (c) obtaining information related to the inconsistent LUN and foreign mapped LUN; wherein the host computing system application reads the metadata file to obtain information regarding the inconsistent LUN and foreign mapped LUN; (d) determining if a new LUN was created after the point in time copy was created for the storage volume; and (e) determining if a LUN at the storage volume is shared with a host computing system.

In another embodiment, a computer program product is provided. The product includes a computer usable storage medium having computer readable code embodied therein for performing a plurality of checks before a volume based snapshot restore (VBSR) operation is performed by a host computing system application, based on a point in time copy of a storage volume; said computer readable code includes: (a) code for determining if the storage volume is a root volume and aborting the VBSR operation, if the storage volume is a root volume; (b) code for determining if any inconsistent logical unit number (LUN) and foreign mapped logical unit number (LUN) exist with respect to the point in time copy of the storage volume; wherein a metadata file for the point in time copy stores information regarding the foreign mapped LUN and the inconsistent LUN; (c) code for obtaining information related to the inconsistent LUN and foreign mapped LUN; wherein the host computing system application reads the metadata file to obtain information regarding the inconsistent LUN and foreign mapped LUN; (d) code for determining if a new LUN was created after the point in time copy was created for the storage volume; and (e) code for determining if a LUN at the storage volume is shared with a host computing system.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 6 shows an example of a report presented to a user, according to one embodiment.

DETAILED DESCRIPTION

Figure 1A:
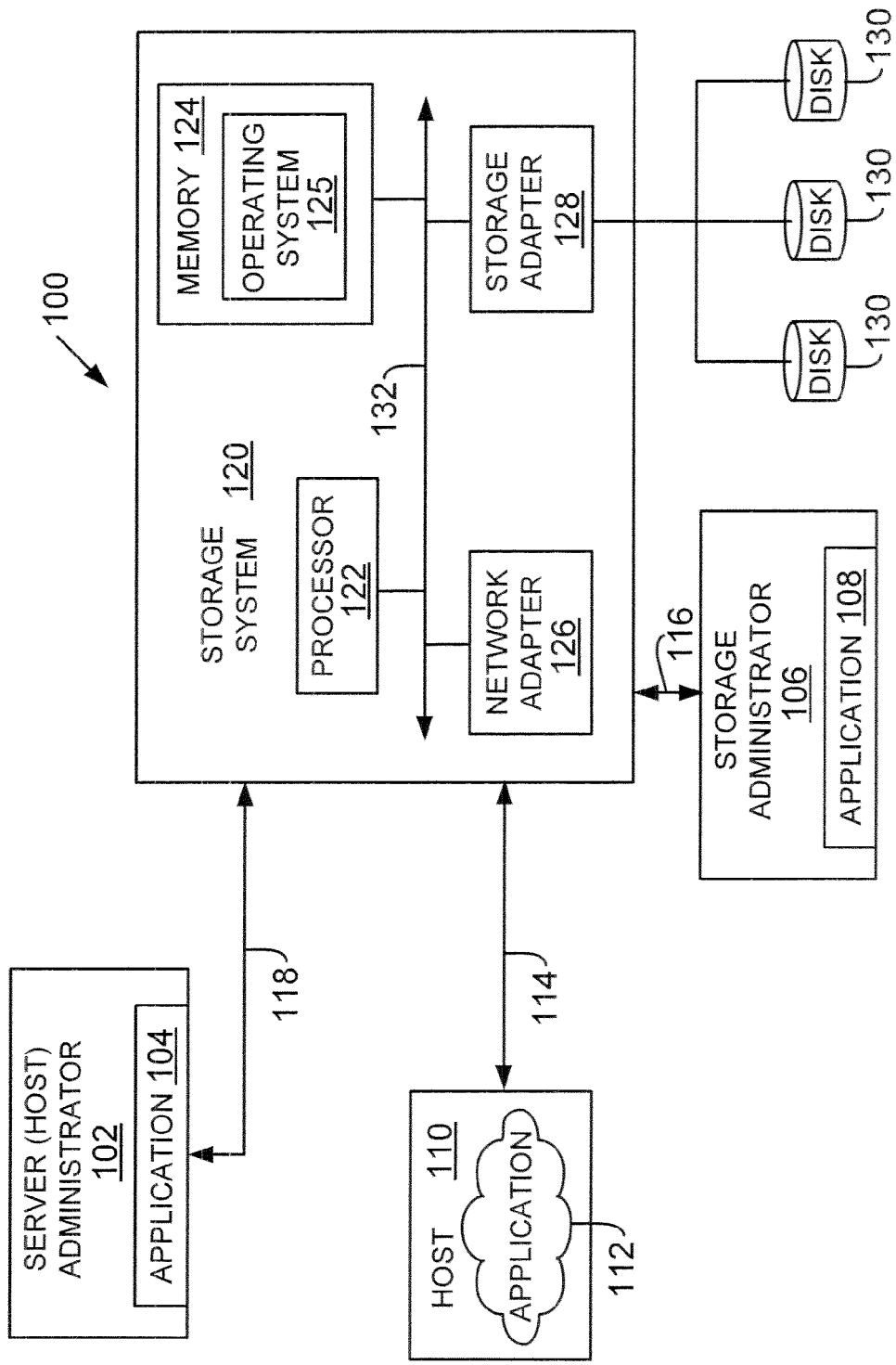
FIG. 1A shows a block diagram of a system using the methodology of the present disclosure.

The following definitions are provided as they are typically (but not exclusively) used in a storage system, implementing the various adaptive embodiments described herein.

"LUN" means a logical unit number. LUN may simply be a number assigned to a logical unit. A logical unit may be an entity that can be addressed by an input/output operation. A typical storage array may be partitioned into several separate storage volumes. To represent each volume, target is configured to provide a LUN. Each target may provide multiple LUNs and thus represent multiple volumes. The LUN concept is applicable to various protocols/standards, for example, Small Computer System Interface (SCSI), Fibre Channel, iSCSI and others.

"Snapshot" means a point in time copy of a storage file system. The snapshot is a persistent point in time (PPT) image of an active file system that enables quick recovery of data after data has been corrupted, lost, or altered. Snapshots can be created by copying data at each predetermined point in time form a consistent image, or virtually by using a pointer to form the image of the data.

"Storage Volume" (or "Volume") means a logical way allocating storage space in a storage device.

"Volume Based Snapshot Restore" means "VBSR", an operation that restores the state of a volume based on a point in time snapshot copy of the volume.

To facilitate an understanding of the various embodiments of the present disclosure, the general architecture and operation of a storage system will first be described. The specific architecture and operation of the various embodiments will then be described with reference to the general architecture.

As used in this disclosure, the terms "component", "module", "system", and the like are intended to refer a computer-related entity, either software, hardware, a combination of hardware and software, or software in execution. For example, a component may be, but is not limited to being, a process running on a processor, a processor, an object, an executable, a thread of execution, a program, and/or computer. By way of illustration, both an application running on a server and the server can be a component.

One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device, in accordance with the claimed subject matter.

It is noteworthy that the term "file" as used throughout this specification includes a container, an object, or any other storage entity.

System:

FIG. 1A is a schematic block diagram of a system 100 having a network storage appliance (may also be referred to as storage system or storage server) that may be advantageously used with the various embodiments disclosed herein. Storage system 120 is a special-purpose computing system that provides various services relating to the organization of information on storage devices, for example, disks (may also be referred to as storage volume) 130. However, it will be understood to those skilled in the art that the inventive embodiments described herein may apply to any type of special-purpose (e.g., server) or general-purpose computer, including a standalone computer.

Storage system 120 may be operationally coupled one or more general purpose computing systems (also referred to as host systems or "hosts"), for example, 102, 106 and 110. Computing system 106 may operate as a dedicated storage administrator and is coupled to storage system via connection 116. In conventional systems, a dedicated storage administrator 106 typically performs the VBSR operation.

Computing system 102 may operate as a server administrator and interface with storage system 120 via connection 118. In one embodiment, a VBSR operation may be performed by a host application 104. Before the VBSR operation is performed, application 104 may perform a plurality of checks to minimize negative consequences of the VBSR operation.

The term host 102 and server administrator 102 are used interchangeably, throughout the specification. Also, application 104 or host based application is used interchangeably. It is noteworthy that although server administrator 102 is shown in host 102, any host system, with the appropriate application and authorization may operate as a server administrator Host 110 may be a client computer used by any user. Host 110 interfaces with storage server 120 via connection 114. Host 110 executes application 112 to interface with storage system 120.

Storage system 120 comprises a processor 122, a memory 24, a network adapter 126 and a storage adapter 128 interconnected by a bus 132. The storage system 120 also includes an operating system 125 that implements a file system to logically organize the information as a hierarchical structure of directories and files on disks 130.

In the illustrative embodiment, memory 124 may include storage locations that are addressable by processor 122 and adapters (126 and 128) for storing software program code and data structures associated with the embodiments of the present disclosure. The processor 122 and adapters (126 and 128) may, in turn, comprise processing elements and/or logic circuitry configured to execute the software code and manipulate the data structures.

The operating system 125, portions of which is typically resident in memory and executed by the processing elements, functionally organizes storage system 120 by, inter alia, invoking storage operations in support of a file service implemented by storage system 120. It will be apparent to those skilled in the art that other processing and memory means, including various computer readable media, may be used for storing and executing program instructions pertaining to the embodiments described herein.

Network adapter 126 comprises the mechanical, electrical and signaling circuitry needed to connect storage system 120 to one or more of hosts 102, 104 or 110 over a computer network (for example, via connections 114, 116 and 118), which may comprise a point-to-point connection or a shared medium, such as a local area network.

Host 110, 102 and/or 106 may execute applications including file system protocols, such as the Common Internet File System (IFS) protocol. Moreover, the clients may interact with the storage system 120 in accordance with a client/server model of information delivery. That is, the client may request the services of the storage system 120, and the storage system 120 may return the results of the services requested by the client, by exchanging packets, e.g., in the CIFS protocol format or a block based format, e.g., the SCSI format. The CIFS protocol is well known and described in Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001 (hereinafter "CIFS specification"), which is hereby incorporated by reference as though fully set forth herein. The block based SCSI format is also well known and is incorporated herein by reference in its entirety.

Storage adapter 128 cooperates with operating system 125 to access information requested by a client application (for example, 104, 108 and/or 112). The information may be stored in disks 130. The storage adapter includes input/output (I/O) interface circuitry that couples to disks 130 over an I/O interconnect arrangement, such as a conventional high-performance, Fibre Channel serial link topology. The information is retrieved by storage adapter 128 and, if necessary, processed by processor 122 (or the adapter 128 itself) prior to being forwarded over system bus 125 to network adapter 126, where the information is formatted into a packet and returned to the client application.

To facilitate access to disks 130, operating system 125 implements a file system that logically organizes the information as a hierarchical of directories and files on the disks. Each "on-disk" file may be implemented as set of disk blocks configured to store information, such as text, whereas a directory may be implemented as a specially formatted file in which other files and directories are stored. An example of operating system 125 is Data ONTAP™ operating system available from Network Appliance, Inc. that implements a Write Anywhere File Layout (WAFL) file system.

It is noteworthy that the storage system, the processes and systems disclosed herein are not limited to processing file based access requests. The adaptive embodiments disclosed herein can support block based storage requests, for example, Small Computer Systems Interface (SCSI) based requests.

Figure 1B:
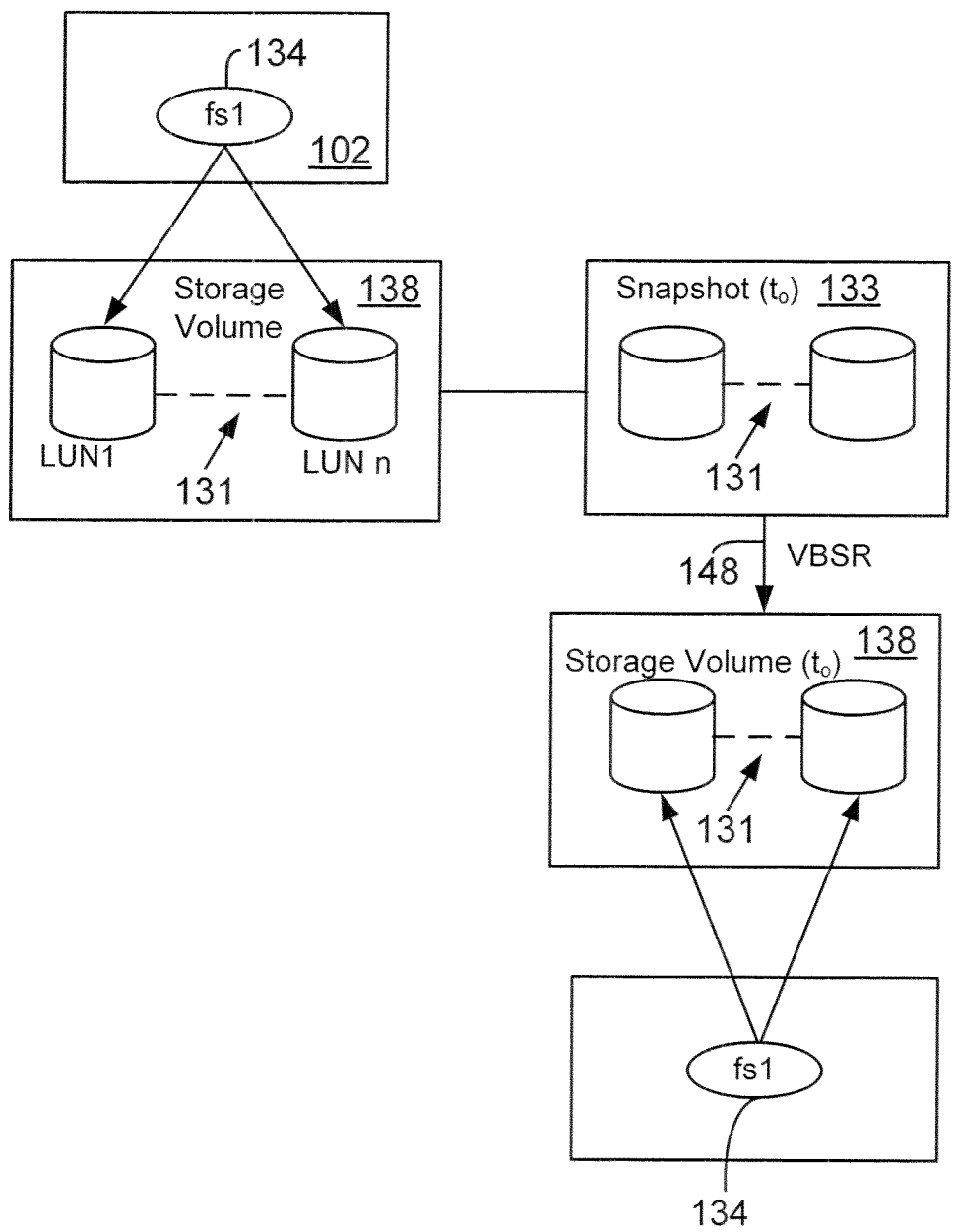
FIG. 1B shows a block diagram illustrating volume based snapshot restore ("VBSR") operation.

Challenges with Volume Based Snapshot Restore (VBSR):

Before describing the challenges for VBSR operations, the snapshot/VBSR operation is described. FIG. 1B shows an example of creating a volume based snapshot and then performing a VBSR operation 148. A file system 134 at host system 102 is associated with a plurality of LUNs 131 at storage volume 138. A snapshot of the storage volume 138 is taken at any given time. The snapshot is stored as 133. A host based application (for example, 104, FIG. 1A) performs then performs the VBSR operation 148 (also referred to herein as VBSR 148) to restore the storage volume state to the instance when snapshot 133 was taken.

There are various challenges to the VBSR operation when performed by a host based application. Some of the challenges and the adaptive embodiments that assist in overcoming these challenges are described below with respect to FIGS. 1C-1M.

Loss of LUNs/Files:

The VBSR operation removes all the LUNs/files that are created after a snapshot is created. Conventional systems do not provide notification to a user before performing the VBSR operation. Some of the lost LUNs and/or files may be important to a user. Therefore, it is desirable to notify the user of such lost LUNs/files.

Figure 1C:
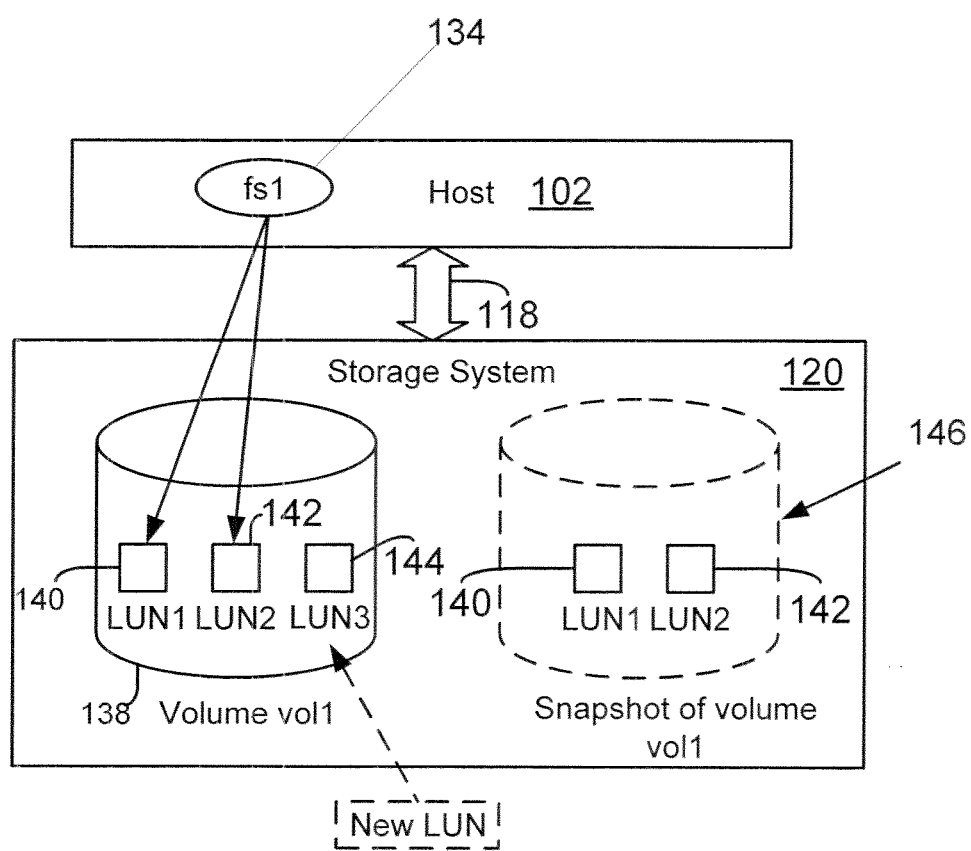
FIGS. 1C-1D show how newer LUNs are processed, according to one embodiment.

FIG. 1C shows host 102 interfacing with storage system 120 via connection 118. Host 102 maintains a file system 134 (shown as fs1 134) associated with LUN1 140 and LUN2 142 at any given time (for example, time $t_0$). At time $t_1$, where $t_1$ occurs after time snapshot 146 of fs1 134 is taken. After the snapshot is taken, a new LUN 144 (shown as LUN3 144) may be created.

Figure 1D:
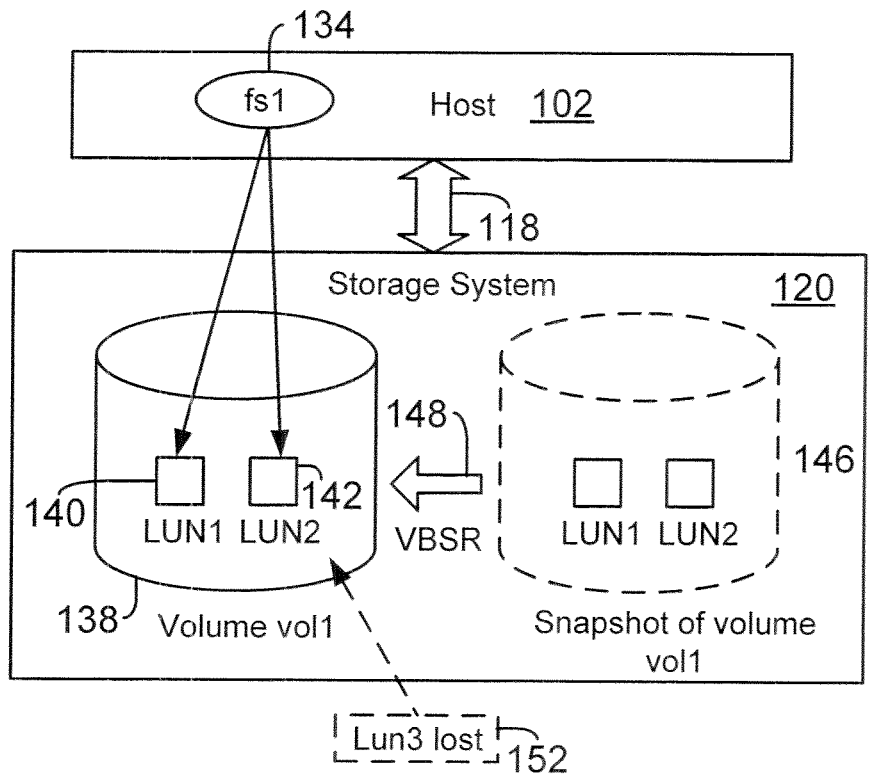

FIG. 1D shows VBSR operation 148 to restore volume 138 as it existed at time, t1 when the snapshot 146 was taken. Upon VBSR 148, only LUN1 140 and LUN2 142 are restored because LUN3 144 was created after time t1. The lost LUN is shown as 152

In one embodiment, host based application 104 determines the LUNs that are present at any given time. To determine the new LUNs, the application compares the LUNs at the given time with the LUNs that were present at the time the snapshot was taken. Before VBSR 148 is performed, the user is notified of the new LUN, for example, LUN3 144. The user in this case may take appropriate action to prevent loss of LUN3 144 or ignore the notification and proceed with VBSR 148. In one embodiment, as described below, the notification is provided via a user interface on a display device controlled by a computing system.

Figure 1E:
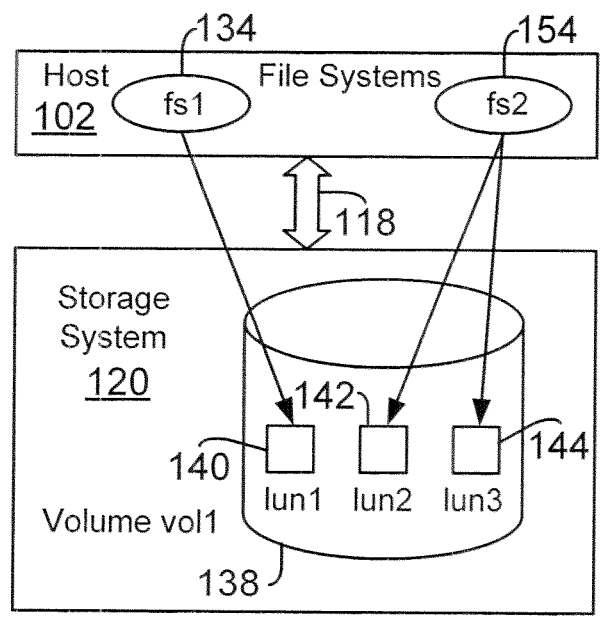
FIGS. 1E-1G show how inconsistent LUNs are processed, according to one embodiment.
Figure 1F:
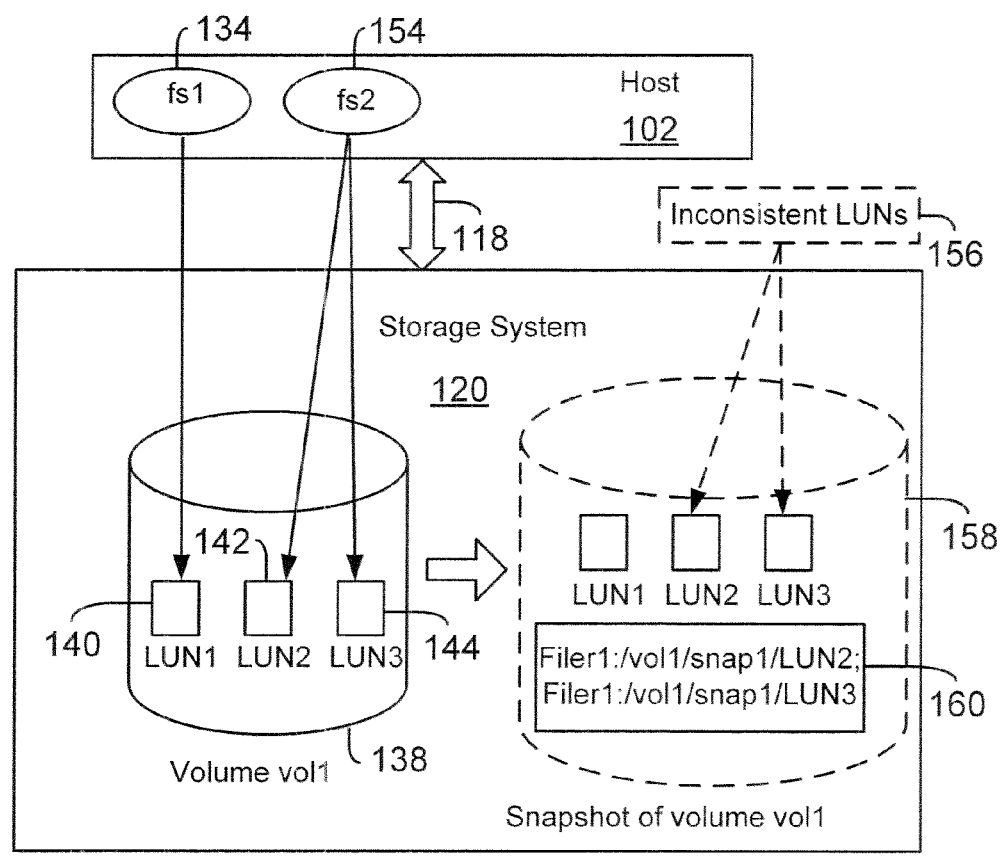
Figure 1G:
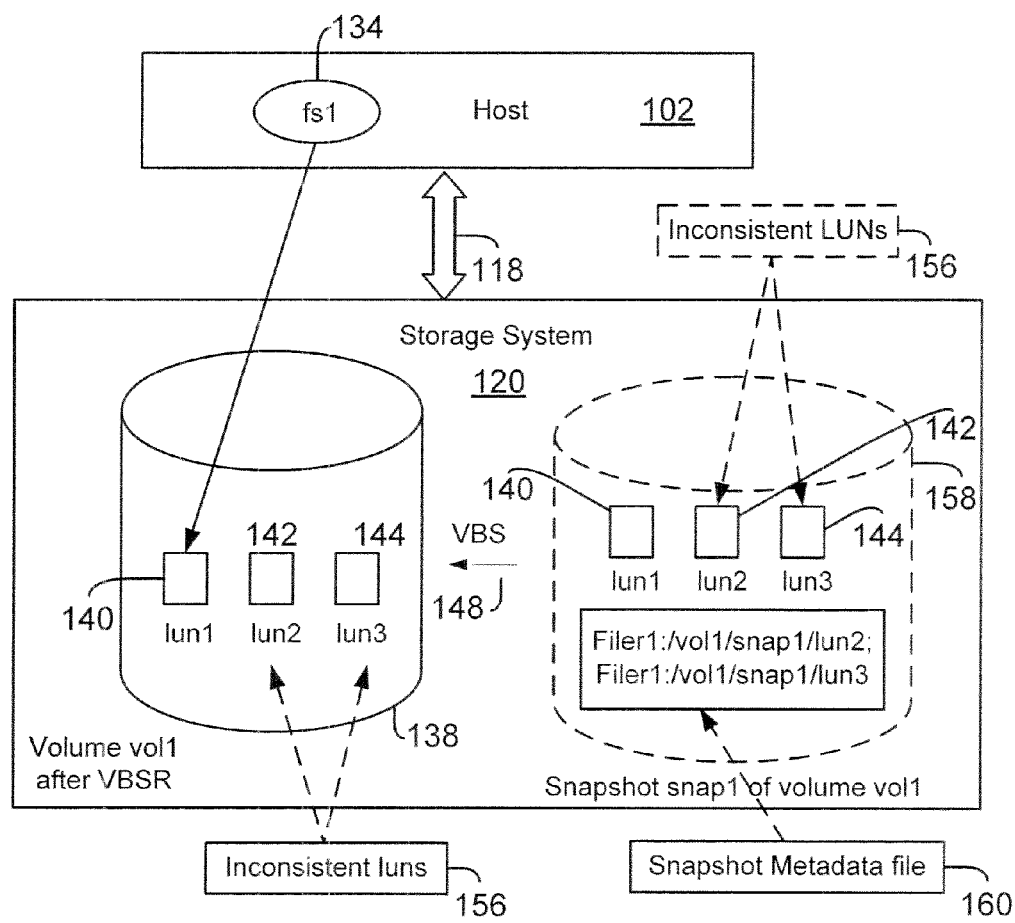

Inconsistent LUNs:

Another challenge for a host based application performing VBSR is handling inconsistent LUNs. FIGS. 1E-1G illustrate the concept of inconsistent LUNs and how the inconsistent LUNs are handled, according to one embodiment of the present disclosure.

FIG. 1E shows an example with two file systems fs1 134 and fs2 154 at host system 102. File system 134 is associated with LUN1 140, while file system 154 is associated with LUN2 142 and LUN3 144 within the same storage volume 138.

FIG. 1F shows that when a snapshot 158 is created only for file system fs1 134, LUN2 142 and LUN3 144 associated with fs2 154 become inconsistent (shown as 156) with respect to snapshot 158. In one embodiment, a path to the inconsistent LUNs 142 and 144 may be stored with data (160) describing snapshot 158. The path shows where the inconsistent LUNs are stored. Data describing snapshot 158 may be referred to as "metadata" and the path to the inconsistent LUNs may be stored within metadata 160.

After the VBSR operation 148, i.e., when snapshot 158 is restored, if LUN2 142 or LUN3 144 is used, it may corrupt the file system. Hence, a server administrator may consider inconsistent LUNs 142 and 144 unusable and reclaim storage space by deleting LUNs 142 and 144. However, since both LUN2 142 and LUN3 144 are used by file system fs2 154, deleting LUN2 142 and LUN3 144 may not be advisable. Hence, it is desirable for a server administrator to be aware of LUN2 142 and LUN3 144, before performing the VBSR operation 148. This allows the user to take proactive action avoid any problems that may occur due to the inconsistent LUNs.

FIG. 1G shows how inconsistent LUNs 142 and 144 are handled when host 102 (or server administrator) performs VBSR 148. In one embodiment, before snapshot 158 is restored, host system application 104 reads the metadata 160 and the user is notified of inconsistent LUNs 142 and 144. This allows the user to take any preventive measure regarding inconsistent LUNs 142 and 144.

Figure 1H:
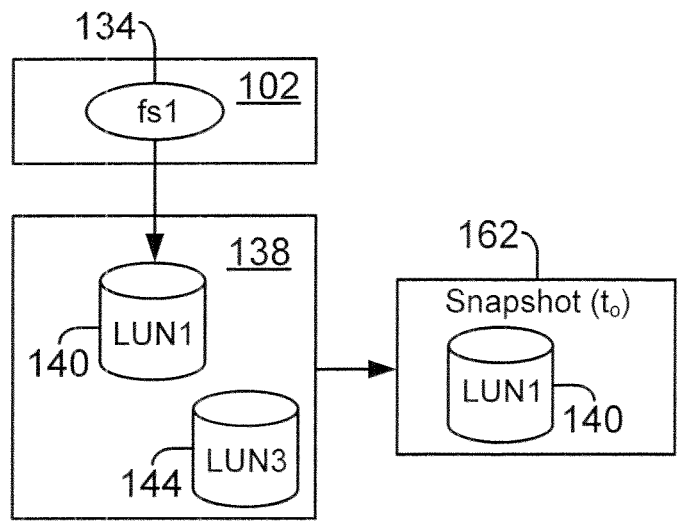
FIGS. 1H-1I illustrate the concept of foreign LUNS that are processed according to one embodiment.
Figure 1I:
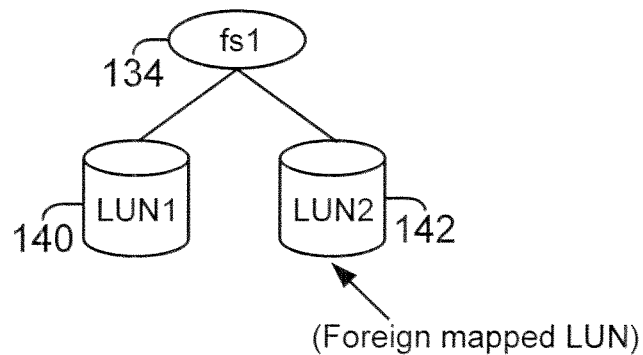

Foreign LUNS:

LUNs which are not part of an active file system and LUNs which are not present when a snapshot for the file system is created may be referred to as "foreign LUNS". FIGS. 1H and 1I show the concept of foreign LUNs.

FIG. 1H shows that file system fs1 134 is associated with LUN1 140 and not with LUN3 144. At time t0, a snapshot 162 is taken with LUN1 140. After t0, a new LUN2 142 is added to fs1 134, as shown in FIG. 1I. This new LUN2 142 did not exist for file system fs1 134 at time t0. Also, LUN3 144 was not a part of fs1 134. Together, LUN2 142 and LUN3 144 may be considered foreign LUNs.

Figure 1J:
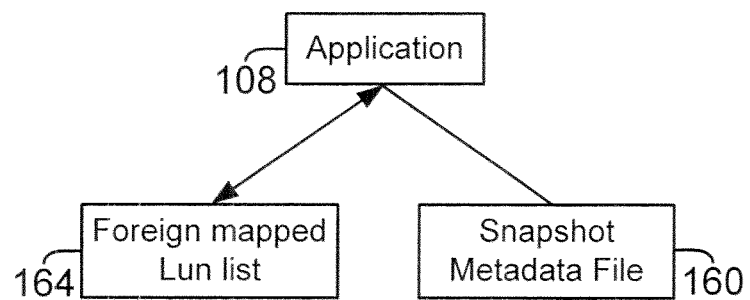
FIG. 1J shows the interaction between a host based application and a foreign mapped LUN list and a snapshot metadata file.

Host based application 108 maintains a foreign mapped LUN list 164, as shown in FIG. 1J. Before a VBSR operation is performed, the host based application 108 reads the list to determine latest foreign LUNs and provides that information to the user.

Newer Snapshots May be Lost:

The VBSR operation also removes all snapshots that were taken after the snapshot which is the basis for the VBSR operation. The loss of other snapshots or loss of backups should be notified to a server administrator. Conventional host based systems do not perform this function. The adaptive embodiments notify the user if any other snapshots will be lost by performing a VBSR operation.

Figure 1K:
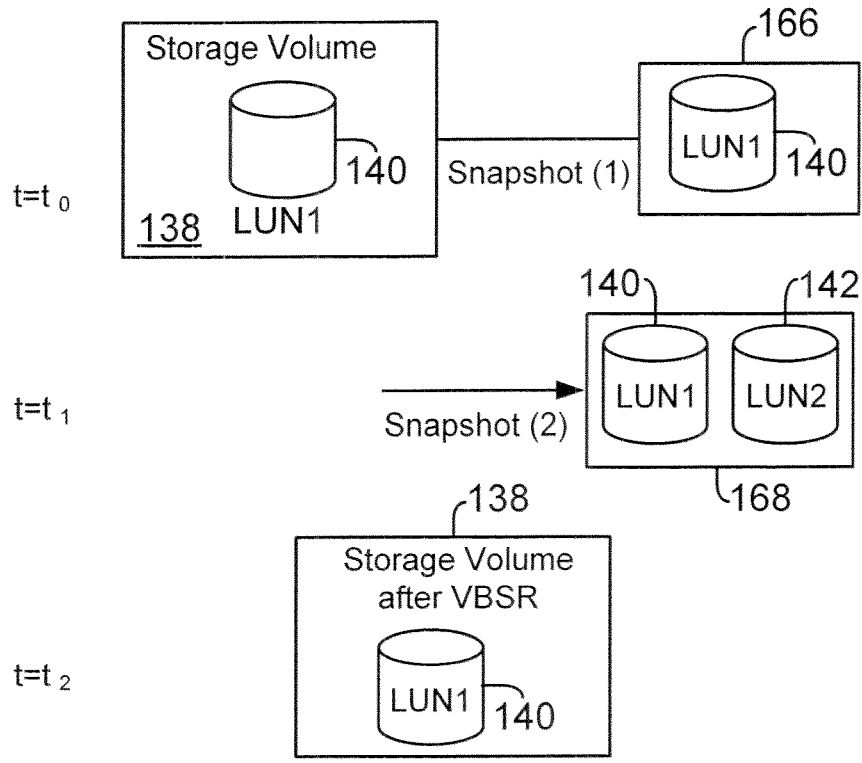
FIG. 1K shows an example of newer snapshots, processed according to one embodiment.

FIG. 1K illustrates snapshot loss after toe VBSR operation. At time $t=t_0$, a snapshot 166 is taken of volume 138. At time, t=t1, which is after t0, another snapshot 168 (snapshot 2) is taken. When a VBSR operation performed at t=t1, to restore the volume based on snapshot 166, the second snapshot 168 may be lost.

Prior to performing the VBSR operation, the host application 108 gets a list of all the snapshots for the volume. The host application compares the time of creation for snapshot 166 with the other snapshots to determine the newer snapshots. Before the VBSR operation is performed, the new snapshot information is provided to the user. This allows the user to take proactive action to avoid loss of newer snapshot information.

Figure 1L:
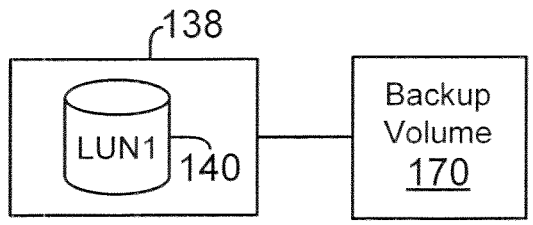
FIG. 1L shows a backup relationship for snapshot file.

Backup Relationships:

Storage volumes are frequently backed up. Typically a user defines how often the storage volume is backed up and which LUNs are backed up. FIG. 1L shows an example where storage volume 138 with LUN1 140 is frequently backed up (shown as 170). The backup relationship may be disrupted after a VBSR operation. To avoid loss of data and disruption in backup relationships, prior to the VBSR operation, the host based application 108 determines if there are any backup relationships and presents those relationships to the user. This allows the user to reestablish the backup relationships after the VBSR operation is performed.

Snapshot Clones:

Snapshots may also be copied or "cloned" for additional redundancy. The cloned snapshots may be affected by a VBSR operation.

Figure 1M:
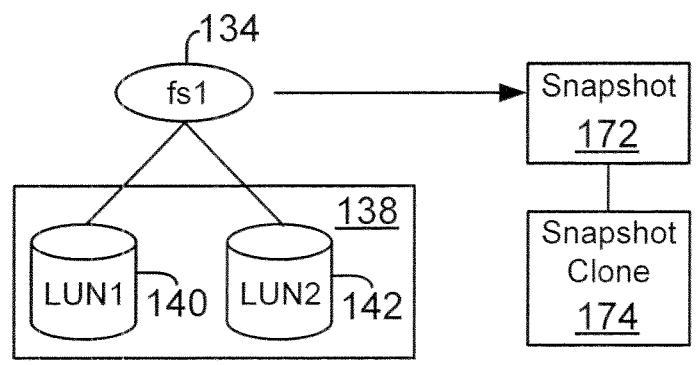
FIG. 1M shows a "clone" relationship for a snapshot file.

FIG. 1M shows the relationship between a snapshot 172 and clone 174. When volume 133 is about to be restored, it may be busy with clone 174. In such a situation, one may not be able to perform VBSR, until volume 138 is disengaged from the clone 174.

In one embodiment, host based application 108 checks for clones and gathers information regarding the clones. The user is notified and appropriate action may be taken handle the "clone" relationship.

Root Volume:

VBSR on a root volume may reboot the entire storage system 120. Root volume includes configuration information for the storage system and any storage system down time may have a severe impact on a data center operations. Hence, VBSR may not be performed on a root volume. As described below, host based application 102 checks to determine if a volume that is being restored is a root volume. If the volume is determined to be a root volume, then VBSR is not performed.

Shared Volume:

A storage volume for example, 138, FIG. 1B) may be shared by other host systems. A VBSR operation may impact storage volume sharing among different host systems. In one embodiment, before a VBSR is performed, the server administrator is notified of the impact of the VBSR on shared volumes. The server administrator can then take appropriate actions to minimize the impact of VBSR.

Process Flow Diagrams:

The various adaptive embodiments are now described below with respect to FIGS. 2-4. The process flow diagrams are described in general with reference to FIGS. 1A-1M and in particular to host 102 and host based application 108.

Figure 2:
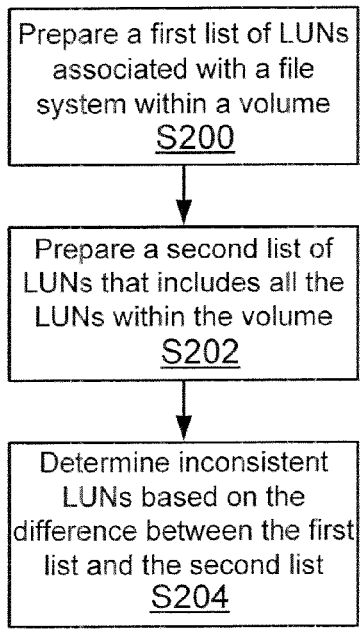
FIG. 2 shows a process flow diagram for determining inconsistent LUNs, according to one embodiment.

Process Flow for Determining Inconsistent LUNs:

FIG. 2 shows a process flow diagram for determining inconsistent LUNs before a VBSR operation is performed, according to one embodiment. The process begins in S200, when a first list of LUNs associated with a file system within a volume is created. An example of this is shown in FIG. 1E where LUN1 140 is a part first list because it is associated with file system (fs1) 134.

In step S202, a second list LUNs is prepared. The second list of LUNs includes all the LUNs within volume 138. This is shown as an example in FIG. 1E where LUNs 140, 142 and 144 are a part the second list because they are all included in storage volume 138.

In stop S204, a difference between the second list and the first list is obtained to ascertain inconsistent LUNs. A path to the inconsistent LUNS is stored in a snapshot metadata file. This is shown in FIG. 1F where inconsistent LUNs 156 are stored in the snapshot metadata 160.

Figure 3:
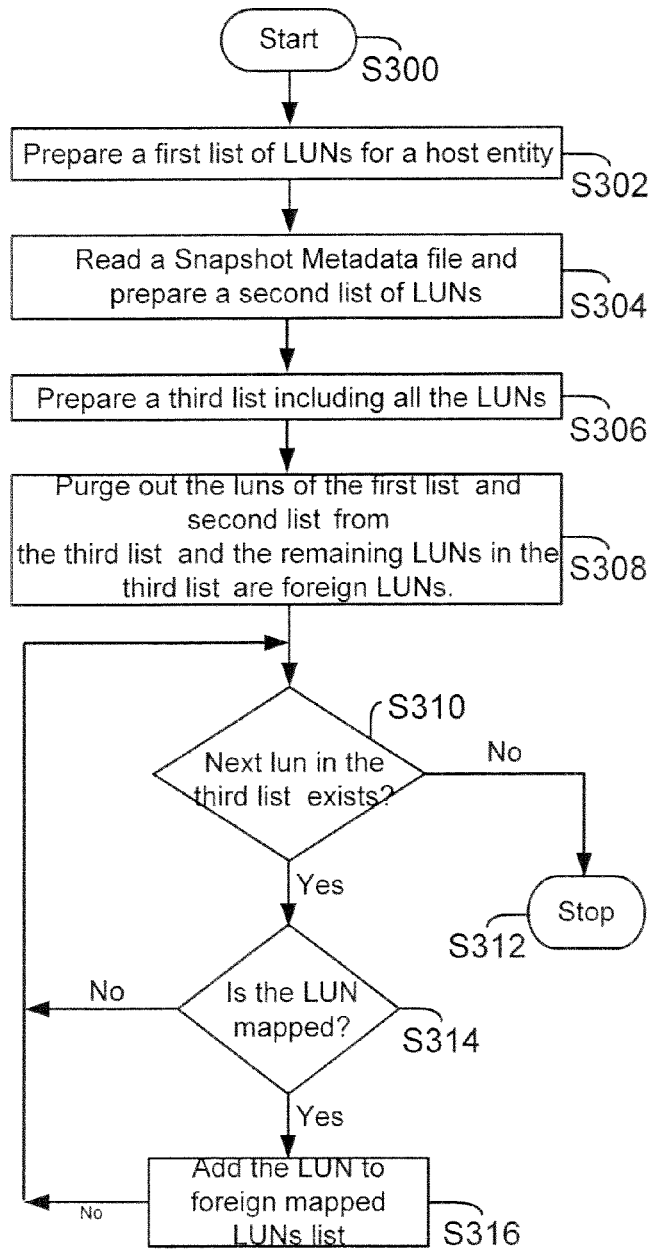
FIG. 3 shows a process flow diagram for determining foreign mapped LUNS, according to one embodiment.

Process Flow for Determining Foreign LUNs:

FIG. 3 shows a process flow diagram for determining foreign LUNs, according to one embodiment. The process begins in step S300. In step S302, a first list is created that includes the LUNs associated with a file system at any given time. In step S304, a snapshot metadata file is read to prepare a second list of LUNs. The second list includes the LUNs that are associated with the file system, when a snapshot was taken. In step S306, a list of all the LUNs associated with the storage volume is created.

In steps 308, the LUNs from list 1 (step S302) and list 2 (step S304) are purged from list 3. The LUNs remaining after the purging operation are the foreign LUNs.

In step S310, the process determines if there is another LUN in the third list If not, then the process ends in step S312, otherwise, in step S314, the process determines if the LUN is mapped to the file system. If the LUN is mapped, then the LUN is added to the foreign mapped list. If not, the process loops back to step S310.

Figure 4:
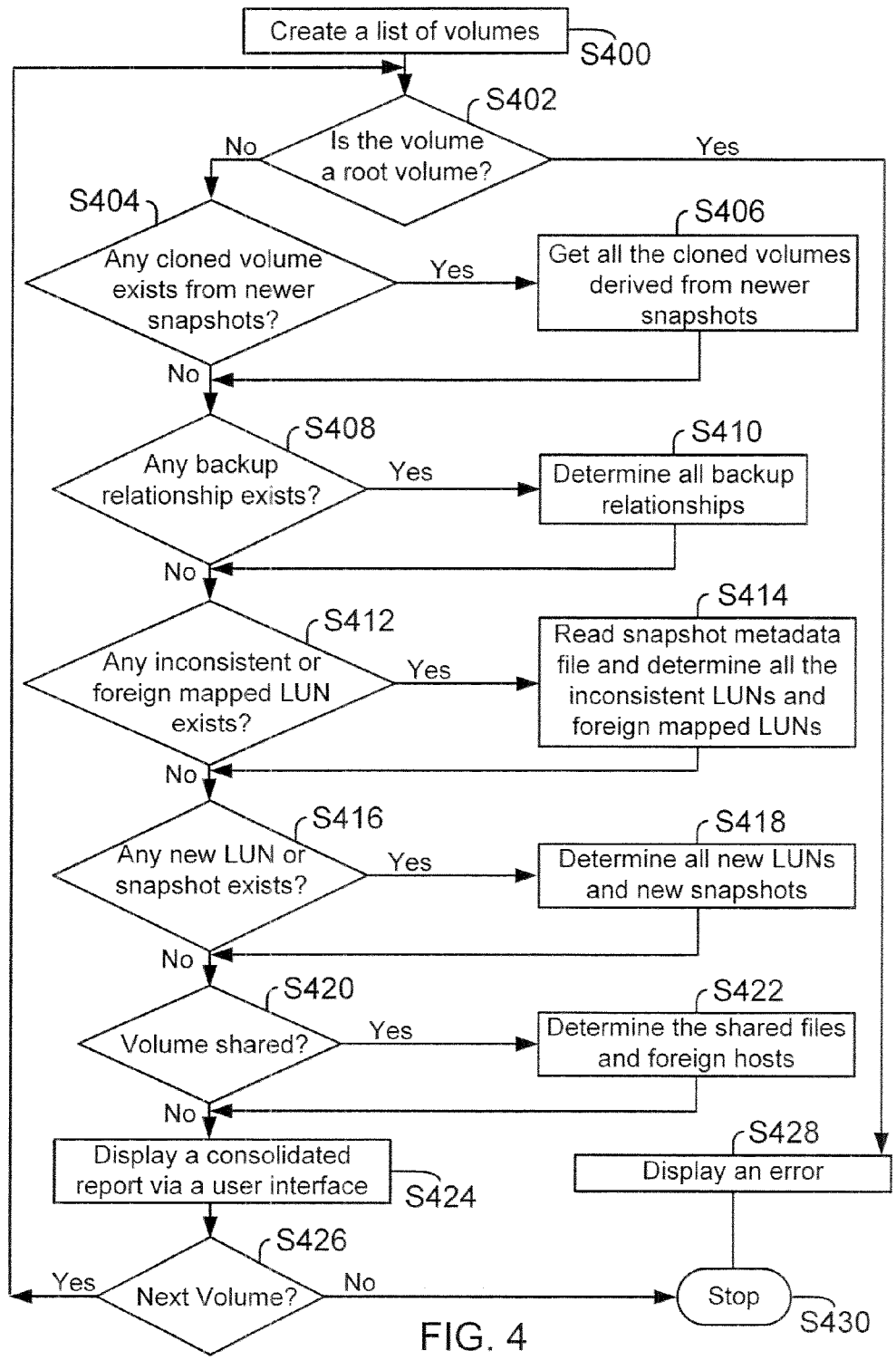
FIG. 4 shows an overall process flow diagram, according to one embodiment.

Overall Process Flow:

FIG. 4 shows the overall process flow diagram for performing pre-VBSR operations, according to one embodiment. Application 104 checks for inconsistent LUNs, foreign mapped LUNs, and newer snapshots, the storage volume is shared by other host systems and if there are newer LUNs. Based on the checks, a consolidated report is provided to a user before the VBSR operation is performed. To minimize any negative consequences due to VBSR operation, the report provides the user with options to take proactive actions.

Referring to FIG. 4, the process begins in step S400 when a first list of volumes associated with a file system is created. In step S402, application 108 determines if a volume from the list of volumes is a root volume. If yes, then the process moves to step S428, where an error is generated and the process ends in step S430. A root volume is not restored by application 108 because that may require re-initialization of storage system 120.

If the storage volume in step S402 is not a root volume, then in step S404, application 108 determines if any cloned volumes exist. If yes, then in step S406 information regarding all the cloned volumes are obtained so that the information can be displayed to a user and the process moves to S408.

If no cloned volume exists, as determined in S404, then in step 6408, application 108 determines if any back up relationships exist. If backup relationships exist, then in step S410, information regarding the backup relationships are determined and the process moves to S410.

In step S412, the process determines if there are any inconsistent and/or foreign mapped LUNs. Step S412 is described above with respect to FIGS. 2 and 3.

If foreign mapped LUNs and inconsistent LUNS exist, then in step S414, the snapshot metadata file (for example, 160, FIG. 1J) is read and all inconsistent LUNs are determined. The foreign mapped LUN list (for example, 164, FIG. 1J) is also read to determine the foreign mapped LUNS and the process moves to S416.

If there are no foreign mapped LUNs and/or inconsistent LUNS, then in step S416, application 108 determines if any new LUNs or new snapshots exist for the volume. If yes, then in step S418, all new snapshots and LUNs are determined and the process moves to step S420.

If no new LUNs or snapshots exist, then in step S420, the process determines if the volume is shared by other hosts. If yes, then in step S422, application 108 determines which files are shared and among which hosts.

In step S424 a consolidated report is presented to the user. The consolidated report displays information gathered in steps S406, S410, S414, S418 and S422. The information in the consolidated report allows a user to take pro-active action so that any potential damage from the USSR operation is minimized.

In step S426, application 108 determines if there is another volume that it has to analyze. If yes, then the process moves back to step S402 to analyze the next volume, otherwise the process ends in step S430.

FIG. 6 shows a screen shot of a consolidated report showing the various pre-VBSR checks that are performed by a host based applications. The report is presented to the user before the VBSR operatic is performed. The report shows a status of the checks, i.e., whether the tests passed or failed. Based on the report, the user can either choose not to proceed with the VBSR operation or take the necessary action to avoid problems that may arise by proceeding with the VBSR operation.

The embodiments disclosed herein have various advantages. For example, because a user can view a consolidated report, the user becomes aware of potential VBSR problems. This allows the user to either not perform the VBSR operation or the user can take preventative measures.

In another embodiment, because a host based application performs the pre-VBSR operations, without having to interface with a storage administrator. This saves the storage administrator computing time and resources.

Figure 5:
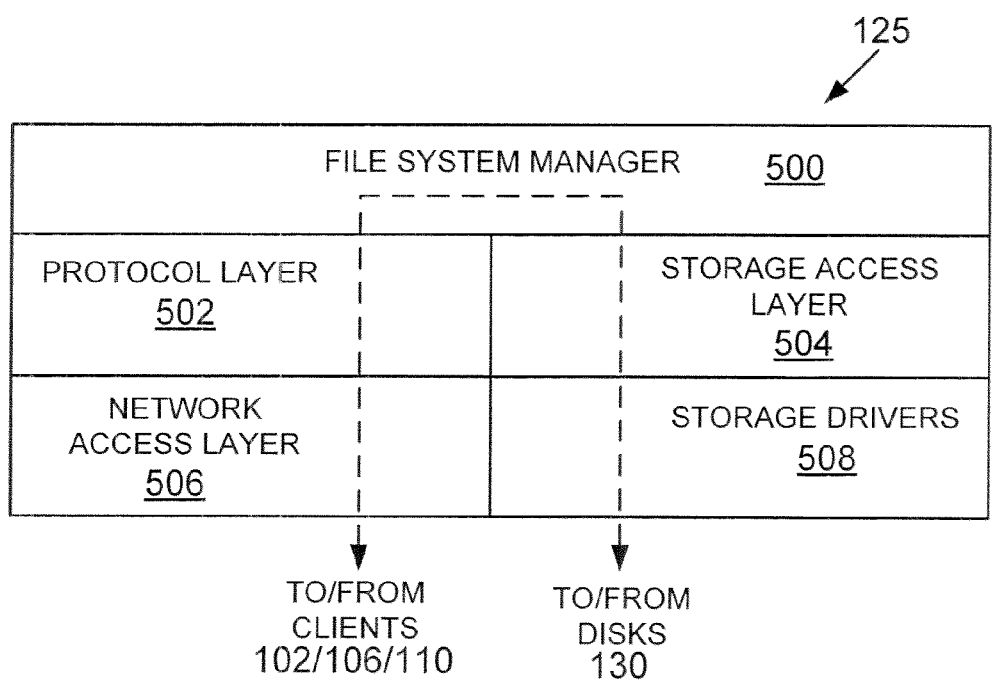
FIG. 5 shows an example of an operating system used by a storage system of FIG. 1A.

Operating System Architecture:

FIG. 5 illustrates a generic example of operating system 125 for storage system 120, according to one embodiment of the present disclosure. In one example, operating system 125 may be installed on storage system 120. It is noteworthy that operating system 125 may be used in any desired environment and incorporates any on more of the features described herein.

In one example, operating system 125 may include several modules, or "layers." These layers include a file system manager 500 that keeps track a directory structure (hierarchy) of the data stored in a storage subsystem and manages read/write operations, i.e. executes read/write operations on disks in response to client 110 requests.

Operating system 125 may also include a protocol layer 502 and an associated network access layer 506, to allow storage system 120 to communicate over a network with other systems, such as clients 110. Protocol layer 502 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 506 may include one or more drivers, which implement one or more lower-level protocols to communicate over the network, such as Ethernet. Interactions between clients 110 and mass storage devices 130 (e.g. disks, etc.) are illustrated schematically as a path, which illustrates the flow of data through operating system 125.

The operating system 125 may also include a storage access layer 504 and an associated storage driver layer 508 to allow storage system 120 to communicate with a storage subsystem. The storage access layer 504 may implement a higher-level disk storage protocol, such as RAID (redundant array of inexpensive disks), while the storage driver layer 508 may implement a lower-level storage device access protocol, such as Fibre Channel Protocol (FCP) SCSI. In one embodiment, the storage access layer 504 may implement a RAID protocol, such as RAID-4 or RAID-DP™ (RAID double parity for data protection provided by Network Appliance, Inc., the assignee of the present disclosure).

It should be noted that the software "path" through the operating system layers described above needed to perform data storage access for the client request received at the storage system may alternatively be implemented in hardware. That is, in an alternate embodiment the invention, the storage access request data path may be implemented as logic circuitry embodied within field programmable gate array (FPGA) or an application specific integrated circuit (ASIC). This type of hardware implementation increases the performance of the file service provided by storage system 120 in response to a file system request packets issued by client 110. Moreover, in another alternate embodiment of the invention, the processing elements of network and storage adapters (126, 128) may be configured to offload some or all of the packet processing and storage access operations, respectively, from processor 122 to thereby increase the performance of the file service provided by the storage system.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method for a storage system, comprising:
   before a volume based snapshot restore (VBSR) operation is performed by a host computing system application, based on a point in time copy of a storage volume;
   (a) determining if any inconsistent logical unit number (LUN) and foreign mapped logical unit number (LUN) exist with respect to the point in time copy of the storage volume;
   (b) obtaining information related to the inconsistent LUN and the foreign mapped LUN;
   (c) determining if a new LUN was created after the point in time copy was created for the storage volume; and
   (d) providing a user with information collected in steps (a) to (c) before the VBSR operation is performed.

2. The method of claim 1, further comprising:
   determining if the storage volume is a root volume and aborting the VBSR operation, if the storage volume is a root volume.

3. The method of claim 1, further comprising:
   determining if a backup relationship exists for the storage volume; and
   if the backup relationship exists, obtaining information regarding the backup relationship for the user.

4. The method of claim 1, further comprising:
   determining if a LUN at the storage volume is shared with another host computing system.

5. The method of claim 1, wherein a metadata file for the point in time copy stores information regarding the foreign mapped LUN and the inconsistent LUN.

6. The method of claim 5, wherein the host computing system application reads the metadata file to obtain information regarding the inconsistent LUN and the foreign mapped LUN.

7. The method of claim 1, wherein the user is provided a report via a user interface to take an action, before the VBSR operation is performed.

8. The method of claim 5, wherein the host computing system application is used by a server administrator.

9. The method of claim 1, wherein the host computing system interfaces with the storage system that maintains the point in time copy of the storage volume.

10. A method for a storage system, comprising:
    before a volume based snapshot restore (VBSR) operation is performed by a host computing system application, based on a point in time copy of a storage volume;
    (a) determining if the storage volume is a root volume and aborting the VBSR operation, if the storage volume is a root volume;
    (b) determining if any inconsistent logical unit number (LUN) and foreign mapped logical unit number (LUN) exist with respect to the point in time copy of the storage volume;
    (c) obtaining information related to the inconsistent LUN and the foreign mapped LUN;
    (d) determining if a new LUN was created after the point in time copy was created for the storage volume;
    (e) determining if a backup relationship exists for the storage volume; and if the backup relationship exists, obtaining the backup relationship information;
    (f) determining if a LUN at the storage volume is shared with a host computing system; and
    (g) providing a user with information collected in steps (b) to (f) such that the user can take an action before the VBSR operation is performed.

11. The method of claim 10, wherein a metadata file for the point in time copy stores information regarding the foreign mapped LUN and the inconsistent LUN.

12. The method of claim 11, wherein the host computing system application reads the metadata file to obtain information regarding the inconsistent LUN and the foreign mapped LUN.

13. The method of claim 10, wherein the user is provided a report via a user interface to take the action, before the VBSR operation is performed.

14. The method of claim 10, wherein the host computing system application is used by a server administrator.

15. The method of claim 14, wherein the host computing system interfaces with the storage system that maintains the point in time copy of the storage volume.

16. A method for a storage system, comprising:
performing a plurality of checks before a volume based snapshot restore (VBSR) operation is performed by a host computing system application, based on a point in time copy of a storage volume, wherein the plurality of checks include:
(a) determining if the storage volume is a root volume and aborting the VBSR operation, if the storage volume is a root volume;
(b) determining if any inconsistent logical unit number (LUN) and foreign mapped logical unit number (LUN) exist with respect to the point in time copy of the storage volume; wherein a metadata file for the point in time copy stores information regarding the foreign mapped LUN and the inconsistent LUN;
(c) obtaining information related to the inconsistent LUN and foreign mapped LUN; wherein the host computing system application reads the metadata file to obtain information regarding the inconsistent LUN and foreign mapped LUN;
(d) determining if a new LUN was created after the point in time copy was created for the storage volume; and
(e) determining if a LUN at the storage volume is shared with a host computing system.

17. The method of claim 16, wherein a user is provided with information collected in steps (a) to (e) of claim 16, such that the user can take an action before the VBSR operation is performed.

18. The method of claim 16, further comprising:
determining if a backup relationship exists for the storage volume; and if the backup relationship exists, obtaining the backup relationship information.

19. The method of claim 17, wherein the user is provided a report via a user interface to take an action, before the VBSR operation is performed.

20. A non-transitory, computer program product, comprising:
a non-transitory computer usable storage medium having computer readable code embodied therein for performing a plurality of checks before a volume based snapshot restore (VBSR) operation is performed by a host computing system application, based on a point in time copy of a storage volume; said computer readable code includes:
(a) code for determining if the storage volume is a root volume and aborting the VBSR operation, if the storage volume is a root volume;
(b) code for determining if any inconsistent logical unit number (LUN) and foreign mapped logical unit number (LUN) exist with respect to the point in time copy of the storage volume; wherein a metadata file for the point in time copy stores information regarding the foreign mapped LUN and the inconsistent LUN;
(c) code for obtaining information related to the inconsistent LUN and foreign mapped LUN; wherein the host computing system application reads the metadata file to obtain information regarding the inconsistent LUN and foreign mapped LUN;
(d) code for determining if a new LUN was created after the point in time copy was created for the storage volume; and
(e) code for determining if a LUN at the storage volume is shared with a host computing system.

21. The computer program product of claim 20, further comprising:
code for determining if a backup relationship exists for the storage volume; and if the backup relationship exists, obtaining the backup relationship information.

22. The computer program product method of claim 20, wherein the user is provided a report via a user interface to take an action, before the VBSR operation is performed.

23. A system, comprising:
a host computing system operationally coupled to a storage system; wherein a processor for the host computing system executes an application for performing a volume based snapshot restore (VBSR) operation, based on a point in time copy of a storage volume; and before the VBSR operation is performed, the application executed by the processor performs a plurality of checks; wherein the plurality of checks include:
(a) determining if the storage volume is a root volume and aborting the VBSR operation, if the storage volume is a root volume;
(b) determining if any inconsistent logical unit number (LUN) and foreign mapped logical unit number (LUN) exist with respect to the point in time copy of the storage volume; wherein a metadata file for the point in time copy stores information regarding the foreign mapped LUN and the inconsistent LUN;
(c) obtaining information related to the inconsistent LUN and foreign mapped LUN; wherein the host computing system application reads the metadata file to obtain information regarding the inconsistent LUN and foreign mapped LUN;
(d) determining if a new LUN was created after the point in time copy was created for the storage volume; and
(e) determining if a LUN at the storage volume is shared with a host computing system.

24. The system of claim 23, wherein the plurality of checks further comprising:
determining if a backup relationship exists for the storage volume; and if the backup relationship exists, obtaining the backup relationship information.

25. The system of claim 23, wherein the user is provided a report via a user interface to take an action, before the VBSR operation is performed by the application.

* * * * *